UNITED STATES PATENT OFFICE.

NICHOLAS SALTABASSI, OF NEW YORK, N. Y.

IMPROVEMENT IN MEDICATED CONFECTIONS.

Specification forming part of Letters Patent No. 132,861, dated November 5, 1872.

*To all whom it may concern:*

Be it known that I, NICHOLAS SALTABASSI, of the city, county, and State of New York, have invented a new and useful Improvement in Medicated Confection, of which the following is a specification:

This invention relates to a new and useful improvement in the line of confections, medicated in such a manner as to make it not only pleasant to the taste, but valuable as a promoter of digestion and a strengthener of weak digestive organs.

The compound is formed as follows: In the first place I take about equal quantities of grapes and Zante currants and reduce the same to a pulp by heating, pressing, or macerating, or in any manner to form a homogeneous mass. The seeds and skins are then separated therefrom by straining or filtering, and then the pulp is heated to evaporate the water and cook the fruit and reduce it to a semi-liquid state. While in this condition I add an extract compound of about equal quantities by weight of Mocha aloes and camomile flowers in the proportion of about one ounce of the extract to one pound of the above-described pulp or sirup. This extract has a hepatic effect, promotes digestion and strengthens the digestive organs, and has a very salutary effect upon the human system generally. Sugar is added in the proportion of about one pound sugar to two pounds of the compound, and dissolved while the latter is still hot. The composition when cold congeals or coagulates and becomes a thick waxy mass. Before cooling the composition may be run into "drops," and before or after cooling it may be divided into pieces of any form convenient for use, after which it is put up into boxes or packages for sale. Other ingredients in addition to those named may be added to give the confection any desired flavor.

Having thus described my invention, I claim as new and desire to secure by Letters Patent—

The above-described confection, substantially as set forth.

NICHOLAS SALTABASSI.

Witnesses:
T. B. MOSHER,
ALEX. F. ROBERTS.